May 24, 1938.  C. H. NAGEL  2,118,682
RUBBER DOLL
Filed Feb. 24, 1938
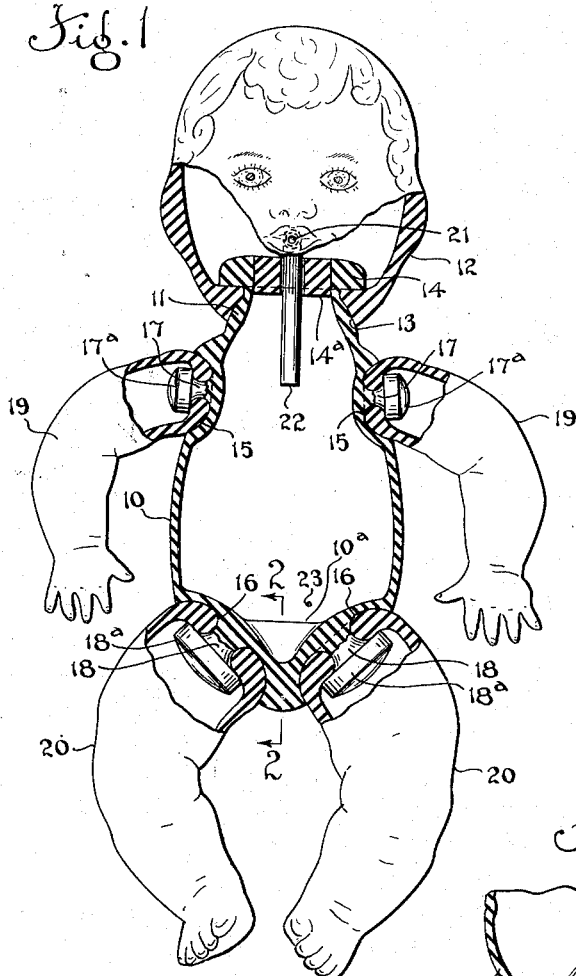
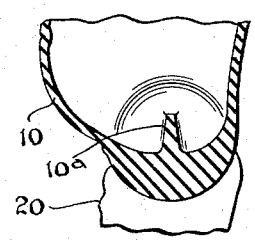
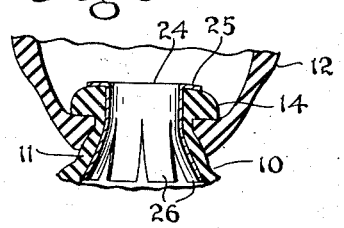
Inventor
Charles H. Nagel
By Ralph Barrow
Attorney Patented May 24, 1938

2,118,682

UNITED STATES PATENT OFFICE 2,118,682

RUBBER DOLL

Charles H. Nagel, Akron, Ohio, assignor to The Sun Rubber Company, Barberton, Ohio, a corporation of Ohio Application February 24, 1938, Serial No. 192,303

4 Claims. (Cl. 46—161)

This invention relates to rubber dolls.

The general purpose of the invention is to provide an improved jointed doll of rubber or like flexible elastic material which will be more economical to manufacture and which will comprise a minimum of parts, obviating entirely the various types of connectors used in such dolls.

Heretofore, in the manufacture of hollow rubber dolls, the mode of attaching the head, arms and limbs to a hollow torso has been suggested by the art pertaining to hollow dolls of hardened plastics and has involved the use in the torso of a connector secured to the head, arms and legs through openings in head, arm and leg sockets. This requires the use of a suitable connector in the torso and has involved the operations of inserting the connector in the torso and then connecting the same with the head, arms and legs. Such a jointed doll presents problems in the provision of inexpensive dolls of the wetting type because if the hollow torso is used as a reservoir there is a tendency for such dolls to leak at the joints and problems are presented in keeping the liquid from running into the hollow arms or legs.

The specific purpose of the present invention therefore is to provide a doll of the type described having a hollow torso which is provided with integral male formations preferably in its various arm and leg sockets whereby the doll can be inexpensively made and assembled.

The foregoing and other purposes of the invention are attained in the hollow rubber doll illustrated in the accompanying drawing and described below. It is to be understood that the invention is not limited to the specific form thereof shown and described.

Of the accompanying drawing:

Figure 1 is an elevation partly broken away and in section and illustrating the improved doll construction.

Figure 2 is a cross section on line 2—2 of Figure 1.

Figure 3 is a fragmentary vertical section of the neck portion of the doll, illustrating an improved neck stiffening member.

Referring to Figures 1 and 2 of the drawing, the numeral 10 designates a hollow rubber torso formed with a male neck joint member 11 having a ball and socket joint connection with a hollow rubber head 12 as indicated at 13, the head 13 being retained on torso 10 by an enlarged integral flange 14 on member 11 engaged in said head. To prevent the head 12 from becoming loose or separated from the torso, a stiffening plug or bushing 14ª of rubber or the like may be provided adjacent the flange 14.

Torso 10 is also preferably formed with arm sockets 15, 15 and leg sockets 16, 16 having continuous, unapertured walls and in which are formed male joint members 17, 17 and 18, 18 formed by stems with enlarged flanges 17ª, 17ª and 18ª, 18ª thereon which respectively are engaged in the usual apertured ball-shaped ends of hollow arms 19, 19 and hollow legs 20, 20 with rubber-to-rubber contacting surfaces between the parts as shown. A reinforcing rib 10ª may be formed interiorly of the torso 10, between the sockets 16, 16, to prevent distortion of the torso when the legs 20 are manipulated.

Because of the flexible elastic nature of the rubber material of which the doll is formed, the joining of the head, arms and legs to the improved torso is easily accomplished by flexing and temporarily stretching or collapsing the joint members as required to insert flanges 14, 17ª and 18ª into the various hollow articulated parts, and the use of a separate connector is obviated. The various parts of the doll are easily molded and stripped from the molds with a minimum of spoilage or waste.

When it is desired to use the above construction as a wetting doll, the mouth 21 may have connected thereto a tube 22 extending well down into the torso past the joint at the neck, and the back part of the torso may have therein a small opening 23 permitting the doll to wet after having been fed a liquid at the mouth.

Referring to Figure 3, in place of the bushing 14ª there may be provided a stiffening bushing 24 having an annular flange 25 adapted to engage the top face of flange 14 on member 11 and having outwardly flexed prongs 26, 26 for engaging the curved inner surface of neck joint member 11. The arrangement is such that the prongs 26 are easily inserted through the opening of the neck, and the bushing, when once in place, will not readily become dislodged.

Modifications of the invention may be resorted to without departing from the spirit thereof or the scope of the appended claims.

What is claimed is:

1. In a hollow rubber figure, a hollow rubber torso and one or more appendages therefor, said torso being formed with one or more sockets in the wall thereof to receive the inner ends of said appendages, said sockets and said inner ends of said appendages being correspondingly formed substantially to fit in rubber-to-rubber contact, one or more male joint members in said sockets integral with said torso and extending outwardly thereof and comprising a stem portion and an enlarged flange on the outer end thereof, said appendages having apertures therein through which said stems extend, said stems fitting in said apertures with substantial rubber-to-rubber contact between the edges of the apertures and the surfaces of the stems, the length of said stems being substantially the thickness of the edges of the appendages about said apertures, the inner walls of said flanges about said stems being in substantial rubber-to-rubber contact throughout with the inside walls of the appendages about said apertures but said inside walls being spaced from the outer peripheral surfaces of said flanges, and each socket being of such depth that each enlarged flange is outside of the torso wall, whereby said appendages may be articulated on said torso by turning in said sockets about said male joint members to various positions of adjustment, the rubber-to-rubber contacting surfaces sliding past each other and said appendages being retained in such positions by friction between the rubber-to-rubber contacting surfaces.

2. In a hollow rubber figure, a hollow rubber torso and one or more appendages therefor, said torso being formed with one or more male joint members integral with said torso and extending outwardly thereof and comprising a stem portion and an enlarged flange on the outer end thereof, said appendages having apertures therein through which said stems extend, said stems fitting in said apertures with substantial rubber-to-rubber contact between the edges of the apertures and the surfaces of the stems, the length of said stems being substantially the thickness of the edges of the appendages about said apertures, the inner walls of said flanges about said stems being in substantial rubber-to-rubber contact throughout with the inside walls of the appendages about said apertures and each enlarged flange being outside the torso wall, whereby said appendages may be articulated on said torso by turning about said male joint members to various positions of adjustment, the rubber-to-rubber contacting surfaces sliding past each other and said appendages being retained in such positions by friction between the rubber-to-rubber contacting surfaces.

3. In a hollow rubber figure, a hollow rubber torso and one or more appendages therefor, said torso being formed with one or more sockets in the wall thereof to receive the inner ends of said appendages, said sockets and said inner ends of said appendages being correspondingly formed substantially to fit in rubber-to-rubber contact, one or more male joint members in said sockets integral with said torso and extending outwardly thereof and comprising a stem portion and an enlarged flange on the outer end thereof, said appendages having apertures therein through which said stems extend, said stems fitting in said apertures with substantial rubber-to-rubber contact between the edges of the apertures and the surfaces of the stems, the length of said stems being substantially the thickness of the edges of the appendages about said apertures but said inside walls being spaced from the outer peripheral surfaces of said flanges, and each socket being of such depth that each enlarged flange is outside of the torso wall, whereby said appendages may be articulated on said torso by turning in said sockets about said male joint members to various positions of adjustment, the rubber-to-rubber contacting surfaces sliding past each other and said appendages being retained in such positions by friction between the rubber-to-rubber contacting surfaces.

4. In a hollow rubber figure, a hollow rubber torso and one or more appendages therefor, said torso being formed with one or more male joint members integral with said torso and extending outwardly thereof and comprising a stem portion and an enlarged flange on the outer end thereof, said appendages having apertures therein through which said stems extend, said stems fitting in said apertures with substantial rubber-to-rubber contact between the edges of the apertures and the surfaces of the stems, the length of said stems being substantially the thickness of the edges of the appendages about said apertures and each enlarged flange being outside the torso wall, whereby said appendages may be articulated on said torso by turning about said male joint members to various positions of adjustment, the rubber-to-rubber contacting surfaces sliding past each other and said appendages being retained in such positions by friction between the rubber-to-rubber contacting surfaces.

CHARLES H. NAGEL.